United States Patent

[11] 3,539,038

[72] Inventors Leroy Taber
1205 S. 76 E. Ave., Tulsa, 74112;
James W. Dillard, 346 S. Oak, Ponca City, Oklahoma 74601
[21] Appl No 730,183
[22] Filed May 17, 1968
[45] Patented Nov. 10, 1970

[54] AUTOMATIC ELECTRIC PARKING BRAKE
19 Claims, 8 Drawing Figs.
[52] U.S. Cl. .............................................. 188/162, 188/106
[51] Int. Cl. .............................................. B60t 13/74
[50] Field of Search .............................. 180/82, 103; 192/3, 188/106F,P, 162

[56] References Cited
UNITED STATES PATENTS
2,251,521 8/1941 McIntyre et al. ......... 188/162
2,933,159 4/1960 Steibinger ............ 188/162X
*Primary Examiner—*Duane A. Reger
*Attorney—* Dunlap, Laney, Hessin & Dougherty

ABSTRACT: An automatic electric parking brake system which includes an electric motor drivingly connected through speed reduction gearing to a threaded shaft forming a portion of a movable carriage assembly. The carriage assembly carries a pair of stop elements which are positioned to contact stationary limit switches mounted adjacent the carriage, with such limit switches being interposed in electrical circuitry connected to the electric motor and adapted to turn the motor in one of two directions of rotation when the circuit through one or the other of the limit switches is closed. The carriage is connected through a lost motion assembly to the parking or emergency brake of an automobile so that this brake is applied when the carriage moves in one direction, and released when the carriage moves in the opposite direction. The electrical circuitry to the electric motor is wired to include the ignition switch of the automobile and suitable relays, such that when the ignition switch is turned to the "ON" position, the motor will be energized to drive the carriage in one direction, thereby releasing the emergency brake and ultimately striking one of the limit switches to open the electrical circuit to the motor, and so that when the ignition switch is turned to the "OFF" position, electrical circuitry will be completed to the motor to drive it in a different direction to move the carriage in a direction to apply the brake. Setting and releasing of the brake is thus accomplished automatically upon actuation of the ignition switch of the automobile.

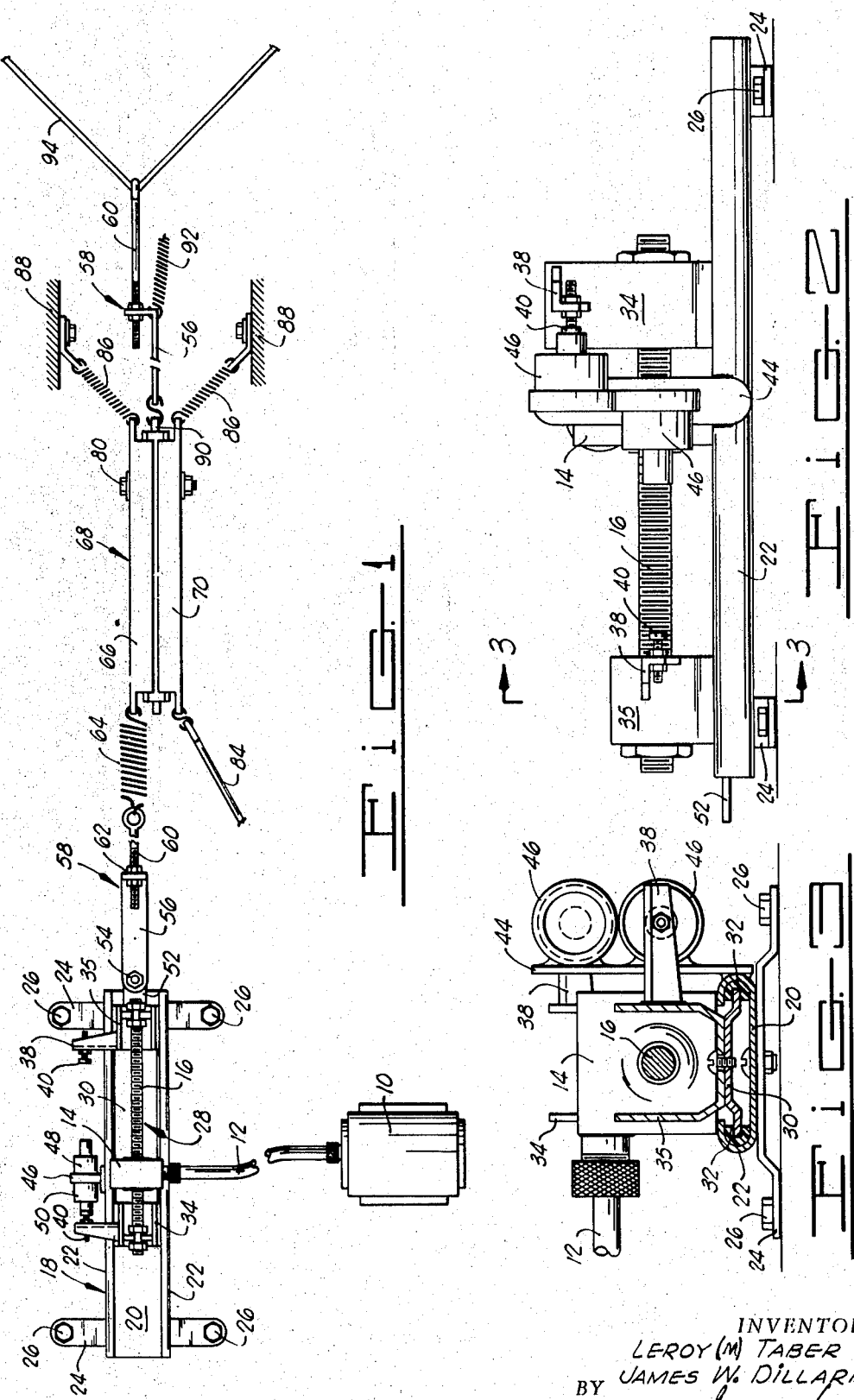

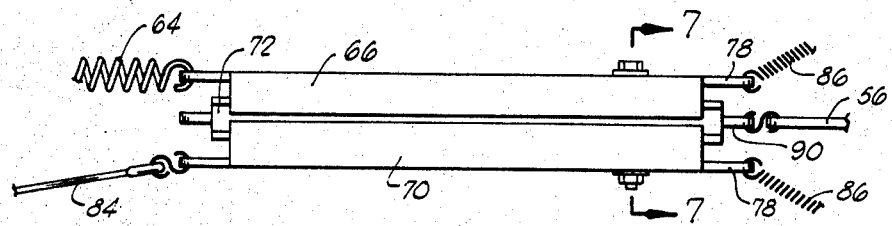
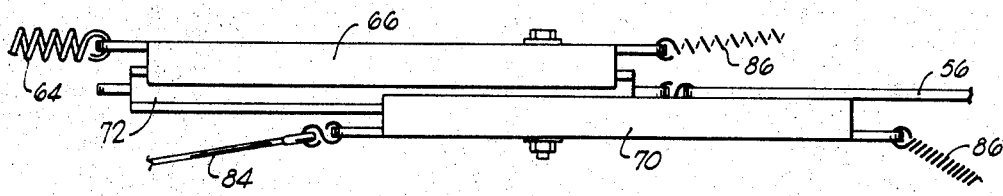
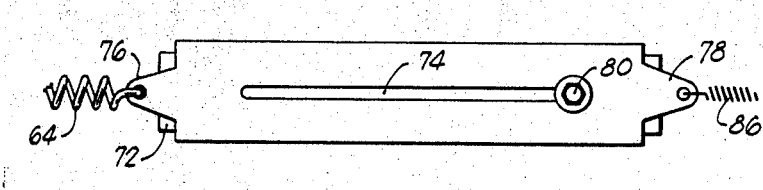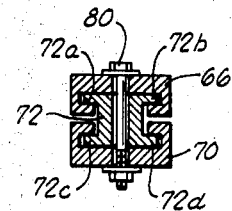
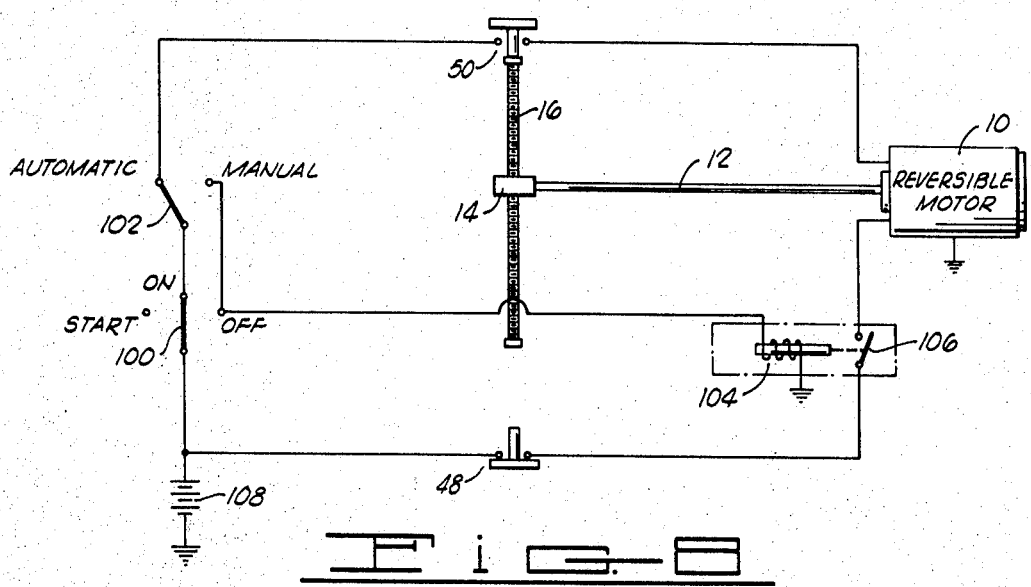

3,539,038

AUTOMATIC ELECTRIC PARKING BRAKE

BACKGROUND OF THE INVENTION

1. Field of the Invention

This invention relates to automatic emergency or parking brake systems for automobiles which are electrically actuated upon opening or closing the ignition switch of the automobile.

2. Brief Description of the Prior Art

A number of prior U. S. patents have proposed to provide an automatic braking system for an automobile which will function, in addition to the foot brake used by the driver during the normal and usual operation of the automobile, to automatically apply an emergency or parking brake when certain operations conducted in the normal course of driving and operating the automobile are carried out. In some of these instances, automatic actuation of mechanism necessary to set or apply the brake is accomplished by the use of the vacuum developed by the internal combustion engine of the automobile, and in others, application of the brake is accomplished by electrical energy. In either event, the systems which have been thus far proposed have generally been complicated in structure and, in some cases, have interfered with the regular braking system of the vehicle, or have excluded the option available to the operator of a manually applied brake which is conventional equipment on most automobiles.

BRIEF DESCRIPTION OF THE PRESENT INVENTION

The present invention may be broadly described as comprising a reversible electric motor, a trackway, a carriage movable in reciprocation on the trackway, and means drivingly connecting the motor to the carriage. The carriage has one of its ends connected through a resilient member to a lost motion assembly which in turn is connected to the cable secured to the emergency brakes located at the rear wheels of the automobile. The lost motion assembly is also interconnected between the manual hand or foot control for the emergency brake and the brake cable so that the automatic electrical brake control system and the manual control system can be utilized independently of each other.

Electrical circuitry including a pair of limit switches, the reversible motor, and the automobile ignition switch is connected to a source of electrical current. The limit switches are preferably mounted on the trackway at spaced points so that stop elements mounted on the carriage will contact the limit switches in alternating sequence as the carriage is reciprocated along the trackway in opposite directions. The circuitry is constructed so that closing the ignition switch (turning it ON to start and run the engine) will energize the reversible motor sufficiently to drive the carriage to one of its limits of travel, and in doing so, will act through the lost motion assembly to release the brake. When the ignition switch is turned OFF, a different circuit is made through the motor to drive it in the reverse direction, and reverse the direction of travel of the carriage until it strikes another limit switch to deenergize the motor. This movement of the carriage tensions the emergency brake cable to set the emergency brakes.

In a preferred embodiment of the invention, the electrical circuitry further includes switching means which permits the described automatic control to be utilized, or as a second option, permits immediate electrical application of the brakes at any time to be effected.

From the foregoing description of the invention, it will be perceived that a major object of the invention is to provide an automatic emergency brake system which functions to automatically apply the emergency or parking brakes when the ignition switch is turned to an OFF status to render the vehicle inoperative, and to automatically release the emergency or parking brakes when the ignition switch is turned to an ON position.

Another object of the invention is to provide an automatic, electrically powered emergency and parking brake system which does not render inoperative or in any way interfere with the conventional manual emergency and parking brake system.

An additional object of the invention is to provide an electrically actuated emergency brake system which can be easily accommodated to the conventional emergency braking system of existing automobiles.

A further object of the invention is to provide an electrically actuated braking system which may be quickly made either automatically actuated in response to the turning on and off of the ignition switch of an automobile, or alternately, may be actuated to apply the emergency brakes at any time desired, regardless of the status of the ignition switch.

Yet another object of the invention is to provide an automatic, electrically actuated parking brake system which is relatively simple and inexpensive in construction, yet is characterized in having a long and trouble-free operating life.

Additional objects and advantages will become apparent as the following detailed description of the invention is read in conjunction with the accompanying drawings.

BRIEF DESCRIPTION OF THE DRAWINGS

FIG. 1 is a diagrammatic plan view of the mechanical portion of the invention.

FIG. 2 is a view in elevation of the channel trackway and movable carriage utilized in the invention.

FIG. 3 is a sectional view taken along line 3–3 of FIG. 2.

FIG. 4 is a side elevation view of a lost motion assembly utilized in the invention.

FIG. 5 is a view similar to FIG. 4, but illustrating an operative position of the lost motion assembly different from that illustrated in FIG. 4.

FIG. 6 is a plan view of the lost motion assembly in the status it occupies in FIG. 4.

FIG. 7 is a sectional view taken along line 7–7 of FIG. 4.

FIG. 8 is electrical circuitry utilized in one embodiment of the invention.

DETAILED DESCRIPTION OF PREFERRED EMBODIMENTS OF THE INVENTION

Referring initially to FIG. 1 of the drawings, the automatic electric parking brake of the invention includes a reversible motor 10 which is drivingly connected through a flexible drive cable 12 to reduction gearing located in a housing 14. The reduction gearing in the housing 14 drivingly engages a threaded shaft 16 which is passed through the housing so that the flexible cable can drive the threaded shaft 16 in reciprocation relative to the housing. The housing 14 is secured to an elongated channel trackway designated generally by reference numeral 18. The channel trackway 18 has a flat bottom plate 20 and a pair of turned over, semicircular edge portions 22 and is open at its opposite ends. The channel trackway 18 carries at its opposite ends, a pair of mounting straps 24 which are apertured so that the channel 18 can be secured to any suitable portion of an automobile by means of bolts 26.

Slidably mounted for longitudinal movement in the channel trackway 18 is a carriage designated generally by reference numeral 28. The carriage 28 includes a base plate 30 which has parallel, longitudinal edges extended into Teflon runners 32 in the manner best illustrated in FIG. 3. The Teflon runners 32 constitute antifriction elements permitting the carriage 28 to move smoothly in the channel trackway 18. Other suitable materials having a low coefficient of friction may be employed in place of the Teflon runners.

Secured to the base plate 30 by means of screws, bolts, welding, or other suitable arrangement, is a pair of U-shaped brackets 34 and 35. Each of the U-shaped brackets 34 and 35 has secured to one of the legs thereof, an outwardly extending supporting element 38 which is positioned above the turned over edge portion 22 of the channel 18. Each of the supporting members 38 carries an adjustable stop member which, in the illustrated embodiment of the invention, is an adjusting screw 40. It will be noted that the position of the head of each adjusting screw 40 with respect to its supporting member 38 can be varied by screwing the adjusting screw varying distances into the supporting member. The head of each of the adjusting screws 40 faces in the general direction of the housing 14 of the reduction gearing located at about the center of the carriage 28 for a purpose which will hereinafter become apparent. It will also be noted in referring to FIGS. 2 and 3 that the supporting members 38 are vertically offset with respect to each other.

Disposed at a location in approximate alignment with the housing of the reduction gearing, and at about the center of the channel trackway 18, is a switch mounting bracket 44 which may be mounted in the illustrated position by welding or otherwise suitably securing its lower end to one of the turned over edge portions 22 of the base plate 20 of the channel trackway 18. The switch mounting bracket 44 includes a pair of retainer rings 46 in which is mounted a pair of limit switches. These limit switches will hereinafter be referred to as an applying limit switch and a releasing limit switch, and will be designated by reference numerals 48 and 50, respectively. The applying limit switch 48 and the releasing limit switch 50, respectively, are connected with the reversible motor 10 in electrical circuitry which will hereinafter be described in greater detail.

Secured to the bight portion of the U-shaped bracket 35 is a tail plate 52 which extends toward the end of the channel trackway 18 and is apertured to accommodate a pivot pin 54. The pivot pin 54 is passed through the aperture in the tail plate 52 and through an L-plate 56 forming a portion of an adjusting link assembly designated generally by reference numeral 58. The adjusting link assembly 58 further includes a bolt 60 having a threaded shank portion which is threaded through lock nuts 62 disposed on opposite sides of one of the legs of the L-plate 56 as best illustrated in FIG. 1. At one end of the threaded bolt 60, the bolt carries an eye to which is connected one end of a relatively large expansion spring 64. The second end of the expansion spring 64 is connected to the emergency or parking brake actuating element 66 forming a portion of a lost motion assembly designated generally by reference numeral 68.

The lost motion assembly 68 includes, in addition to the automatic brake actuating element 66, a manual brake actuating element 70 and a central guide member 72. The automatic brake actuating element 66 and the manual brake actuating element 70 are each of C-shaped cross-sectional configuration as best illustrated in FIG. 7, and are each provided with a centrally located, elongated slot 74 as shown in FIG. 6. Each of the brake actuating elements 66 and 70 also includes apertured nose pieces 76 and 78 located at each end thereof.

The central guide member 72 is of generally H-shaped cross-sectional configuration and has outwardly extending, substantially parallel flange pairs 72a, 72b, 72c, and 72d which define elongated slots or grooves receiving the in-turned flanges of the automatic brake actuating element 66 and the manual brake actuating element 70. A retainer bolt 80 is extended through the central guide member 72 relatively near to its end opposite the end of the lost motion assembly 68 which is connected to the expansion spring 64. The bolt 80 is also extended through the elongated slots 74 which are located in both the automatic brake actuating element 66 and the manual brake actuating element 70. With this arrangement, both of the brake actuating elements 66 and 70 are free to slide longitudinally with respect to the guide member 72 until the bolt 80 has moved to one end or the other of the slot 74 in the respective actuating elements.

The manual brake actuating element 70 has its end most remote from the bolt 80 connected to one end of a pull rod 84 which is secured at its opposite end (not visible) to a conventional mechanical linkage which interconnects the pull rod to the usual hand or foot emergency brake element adapted for manual actuation by the driver of the automobile. At their ends opposite the ends connected to the expansion spring 64 and the rod 84, respectively, the automatic brake actuating element 66 and the manual brake actuating element 70 have their respective apertured nose pieces 78 connected to relatively small retraction springs 86 which are connected by any suitable means to the frame 88 of the automobile in the manner illustrated in FIG. 1. At the same end of the lost motion assembly 68, a projecting flange 90 of the central guide member 72 is connected to a rear adjusting link assembly 58 of the type which has been hereinbefore described. The adjusting link assembly 58 thus includes an L-plate 56 and a threaded bolt 60. The L-plate 56 is preferably secured to the frame through an intervening, relatively small, retraction spring 92.

Extended through the eye of the threaded bolt 60 is a flexible brake cable 94 which is extended rearwardly along the automobile (not shown) and connected at its opposite ends to the emergency or parking brakes of the automobile in a conventional manner. In some instances, it may be desirable to connect the rear adjusting link 58 to a lever bar provided in some automobile models for the purpose of applying leverage to the brake cable 94. Where this arrangement is in use, the automatic electric parking brake system of the invention can easily be adapted to connection to the lever bar.

The electrical circuitry employed in the present invention is illustrated in FIG. 8 of the drawings.

It will be noted in referring to this FIG. that, as previously indicated, the electrical circuitry includes the reversible motor 10, the applying limit switch 48, and the releasing limit switch 50. Also included in the electrical circuitry is a conventional automobile ignition switch 100 having ON, OFF, and START positions as illustrated. There is optionally provided in the circuitry, a two-position switch 102 for placing the emergency brake system in automatic operation, or for manually applying the emergency brake through the use of this switch in a manner which will be hereinafter described. The circuitry further includes a relay 104 which is connected in parallel with the releasing limit switch 50 and which actuates a switch 106 when the relay is energized. A battery 108 provides a source of electrical current to operate the system, and the battery, reversible motor 10, and the coil of the relay 104 are grounded in the manner illustrated in FIG. 8.

OPERATION

The operation of the automatic electric parking brake of the invention will be described from the standpoint of manipulation by the driver of the automobile of the switch controls provided on the dashboard of the vehicle. Let it be assumed that the emergency or parking brake of the vehicle is in a released status during driving of the automobile, and it is desired to park or terminate operation of the vehicle. At this time, the driver of the automobile first turns the ignition switch 100 to the OFF position as illustrated in FIG. 8. When the switch is in this position, an electrical circuit is made from the battery, through the ignition switch and through the coil of the relay 104 to ground. This status then results in the switch 106 being closed by the relay 104, and a circuit being made through the normally closed brake applying limit switch 48 to the reversible motor through the switch 106.

The circuit is completed to ground, and the reversible motor is energized to drive the flexible cable 12 in rotation. The flexible cable in turn drives the reduction gearing located in the housing 14 in a direction to cause the threaded shaft 16 to be reciprocated through this housing in a downward direction in the diagrammatic illustration of FIG. 8, or toward the left as the shaft 16 is viewed in FIG. 1. Movement of the threaded shaft 16 toward the left in FIG. 1 also carries with it the carriage 28 so that the adjusting screw 40 moves toward the applying limit switch 48. The reversible motor 10 continues to drive the threaded shaft 16 in the direction of the brake applying limit switch 48 until this limit switch is contacted and opened by the biasing force exerted by the adjusting screw 40.

As the carriage 28 moves toward the left as viewed in FIG. 1, it carries with it the tail plate 52 and the adjusting link assembly 58 which is pivotally connected to the tail plate through the L-plate 56. The L-plate 56 is positioned so that it may move between the up turned side edges 22 of the trackway channel 18 and movement of the carriage 28 in the described direction will bring the L-plate 56 over the bottom plate 20 of the channel trackway. Movement of the adjusting link assembly 58 toward the channel trackway 18 tensions the expansion spring 64 with the result that a pull is applied to the automatic brake actuating element 66 of the lost motion assembly 68.

As the automatic brake actuating element 66 of the lost motion assembly 68 is reciprocated toward the channel trackway 18, it necessarily carries with it the central guide member 72, since the bolt 80 is limited in its movement with respect to both the automatic brake actuating element 66 and the central guide member 72 by its contact with the end of the elongated slot 74 in the automatic brake actuating element. The central guide member 72 is able to slide longitudinally with respect to the brake actuating element 70, and the retraction spring 86 connected to the latter element retains it in the position illustrated in FIG. 5. The lower end of the bolt 80 slides along the slot 74 provided in the manual brake actuating element 70, and the flat leg of the L-plate 56 is able to move between the facing, in turned flanges of the manual brake actuating element as it follows the central guide member 72.

The function of the expansion spring 64 in the assembly is to prevent the severance of the brake cable 94 or stalling out of the reversible motor 10. Adjustments of the amount of force applied by the assembly through the brake cable 94 to the emergency brakes at the rear of the vehicle can be effected by adjusting the threaded bolt 60 in its relation to the L-plate 56 and lock nuts 62.

Now let it be assumed that the emergency or parking brake is in an applied or set status as has been described above, and it is desired to start the vehicle, release the emergency brake, and proceed with normal driving operations. At this time, the driver of the automobile first turns the ignition switch to the START and then to the ON position. When the ignition switch is in the ON position and the switch is positioned for AUTOMATIC operation, a circuit is made from the battery 108 through the switches 100 and 102, and through the normally closed releasing limit switch 50 to the reversible motor 10 where the circuit to ground is completed. This will energize the reversible motor so as to drive the flexible drive cable 12 in a direction such that the threaded shaft 16 is moved in a direction to move the head of the adjustable screw 40 carried on the bracket 34 toward the releasing limit switch 50. This entails a movement of the carriage 28 to the right as it is viewed in FIG. 1. The normally closed limit switch 50 remains closed to complete the circuit to the reversible motor 10 until it is contacted by the head of the adjusting screw 40 carried on the supporting member 38 secured to the U-shaped bracket 35. At this time, the releasing limit switch 50 is opened as illustrated in FIG. 8 so that current flow to the reversible motor 10 is interrupted. The motor 10 thus stops and the reciprocating motion of the threaded shaft 16 and the carriage 28 is also terminated.

When the threaded shaft 16 and the carriage 28 to which it is connected have moved to this position, the tail plate 52 connected to the base plate 30 of the carriage has been moved by the moving carriage to the right as it is viewed in FIG. 1 to relieve the tension in the expansion spring 64. This permits the retraction spring 86 to return the automatic brake actuating element 66 to its position of alignment with the central guide member 72 and the manual brake actuating element 70. Simultaneously, the retraction spring 92 connected to the adjusting link assembly 58 which is secured to the rear end of the central guide member 72, coupled with the acting tension in the brake cable 94, retracts the central guide member 72 to its position of alignment with the automatic brake actuating element 66 and the manual brake actuating element 70. The brakes are thus released and they remain released as long as the ignition switch 100 is turned to the ON position and the AUTOMATIC-MANUAL two-position switch 102 is in the AUTOMATIC position as illustrated in FIG. 8.

It will perhaps be apparent from the foregoing description that an alternate mode of operation of the emergency parking brake is always available using the system as thus far described. Thus, the usual manual setting or application of the emergency or parking brake can be effected through the conventional hand lever or foot brake provided for this purpose due to the inclusion in the system of a lost motion assembly 68. Thus, when the conventional hand brake or foot pedal actuator is operated by the driver of the automobile, pull is applied through the rod 84 to the manual brake actuating element 70. The manual brake actuating element 70 can then move forward without disturbance of the automatic brake actuating element 66 due to the construction of the lost motion assembly 68. As the manual brake actuating element 70 is pulled forward, it carries with it the central guide member 72. The central guide member 72 can slide relative to the automatic brake actuating element 66 by reason of its grooved structure, and the automatic brake actuating element 66 is retained in its inoperative or released position by the bias exerted by its associated retraction spring 86. As the central guide member 72 moves forward, it acts through the adjustable link assembly 58 to tension the brake cable 94 in the manner hereinbefore described.

Another optional feature of the present invention which is included in the preferred embodiment of the circuitry used to operate the braking system of the invention is the two-position AUTOMATIC-MANUAL switch 102 depicted in FIG. 8. When this switch is positioned in the automatic position and the ignition switch is turned on, the same action as has been described will occur, and when the ignition switch is turned off, the emergency brake will be automatically applied, also as hereinbefore discussed. There may be occasions, however, when it is desired to apply the emergency brake, even though the ignition switch is at that time on and in automatic operation. The emergency brake would not be applied on such occasions.

To then apply the emergency brake, the switch 102 is moved to the MANUAL position, and in this position, a circuit is immediately made through the coil of the relay 104 to ground. This closes the switch 106 in the manner hereinbefore described. With closure of the switch 106, a circuit is made through the reversible motor 10 to ground. The reversible motor 10 is thus driven in a direction such that the shaft 16 is moved in a brake applying direction, that is, to the left as viewed in FIG. 1 of the drawings. This action will move the entire carriage 28 to the left, tensioning the expansion spring 64 and drawing the automatic brake actuating element 68 toward the channelled trackway 18 and carriage 28. The central guide member 72 will move with the automatic brake actuating element 66, and the brake cable 94 will be tensioned to apply the emergency brakes.

From the description of the switch 102 in the electrical circuitry, it will be perceived that this switch enables the operator to constantly have available, the option of whether to maintain the electrically actuated brake system in automatic operation, or to use it for quickly and easily applying the emergency brake at any time, despite the ON or driving status of the ignition switch. It should further be pointed out that the inclusion of the AUTOMATIC-MANUAL switch 102 in the circuitry still permits the operator to utilize the conventional manual emergency brake system hereinbefore described at any time that this may be desired.

Although preferred embodiments of the invention have been herein described in order to illustrate the operating principles of the invention in its preferred mode of practice, it should be recognized that various changes and innovations in the described structure can be effected without departure from the basic principles underlying the invention. All modifications and changes of this type are therefore deemed to be circumscribed by the spirit and scope of the invention except as the same may be necessarily limited by the appended claims or reasonable equivalents thereof.

I claim:

1. An automatic electric parking brake system comprising:

a reversible motor;

a carriage drivingly connected to said reversible motor for reciprocating movement in response thereto;

a trackway movably supporting said carriage and adapted for securement to an automobile;

a lost motion assembly comprising an automatic brake actuating element flexibly connected to said carriage for following the movements of said carriage;

a manual brake actuating element;

a central guide member slidably positioned between and interconnecting said automatic brake actuating element and manual brake actuating element; and means for moving said central guide member with either one of said brake actuating elements relative to the other brake actuating element when said one brake actuating element is reciprocated in one direction;

means connected to said manual brake actuating element for connecting said manual brake element to a manual brake applying device;

flexible means secured to said central guide member and adapted for connecting said central guide member to a brake;

a pair of spaced limit switches;

means mounted on said carriage and positioned for alternately contacting said limit switches during the reciprocating movement of said carriage;

an automobile ignition switch;

a battery; and electrical circuitry interconnecting said reversible motor, limit switches, ignition switch and battery for driving said motor in one direction when said ignition switch is turned to an ON position and one of said limit switches is closed, and for driving said reversible motor in a second direction when said ignition switch is turned to an OFF position and the other of said limit switches is closed.

2. An automatic electric parking brake system as defined in claim 1 and further characterized to include:

a flexible drive cable drivingly connected to said reversible motor;

gearing connected to said flexible drive cable; and a threaded shaft secured to said carriage and engaged by said gearing.

3. An automatic electric parking brake system as defined in claim 1 wherein said trackway comprises:

a flat bottom plate;

turned over edge portions engaging and guiding said carriage; and means for securing said bottom plate and edge portions to an automobile.

4. An automatic electric parking brake system as defined in claim 1 wherein said carriage comprises:

an elongated base plate movably mounted in said trackway;

first mounting means secured to said base plate;

second mounting means secured to said base plate and spaced therealong from said first mounting means;

a first stop member carried by said first mounting means and positioned for contacting one of said limit switches as said carriage reciprocates in one direction; and a second stop member carried by said second mounting means and positioned for contacting the other of said limit switches as said carriage reciprocates in a direction opposite from said one direction.

5. An automatic electric parking brake system as defined in claim 1 and further characterized as including a switch mounting bracket secured to said trackway and supporting said limit switches in alignment with said switch contacting means.

6. An automatic electric parking brake system as defined in claim 1 wherein each of said brake actuating elements comprises an elongated, rigid member of C-shaped transverse cross-sectional configuration having an elongated slot through the bight portion of the C-shaped cross section; and wherein said central guide member is an elongated member of H-shaped cross-sectional configuration defining a pair of longitudinally extending grooves slidingly receiving the edge portions of said brake actuating elements.

7. An automatic electric parking brake system as defined in claim 6 wherein said moving means comprises a retainer bolt secured to said central guide member and projecting through the elongated slots in said automatic and manual brake actuating elements.

8. An automatic electric parking brake system as defined in claim 1 and further characterized to include at least one adjusting link assembly connected to said lost motion assembly and between said carriage and said flexible means, said adjustable link assembly including:

an L-plate; and a threaded bolt threaded a pre-adjusted length through said L-plate.

9. An automatic electric parking brake system as defined in claim 8 wherein said L-plate has an end connected to said carriage, and wherein said system further includes a spring connected to said threaded bolt and to said automatic brake actuating element.

10. An automatic electric parking brake system as defined in claim 8 wherein said L-plate has an end connected to said central guide member, and said threaded bolt has an end connected to said flexible means.

11. An automatic electric parking brake system as defined in claim 3 wherein said carriage comprises:

an elongated base plate having opposed longitudinal edges; and antifriction, synthetic resin runners secured to each of said opposed longitudinal edges and slidingly engaged by said turned over edge portions of said trackway.

12. An automatic electric parking brake system as defined in claim 11 wherein said carriage further includes:

a first U-shaped bracket secured to said base plate adjacent one end thereof;

a second U-shaped bracket secured to said base plate adjacent the opposite end of said base plate from that nearest said first U-shaped bracket;

a first supporting member secured to said first U-shaped bracket and extending outwardly therefrom;

a second supporting member secured to said second U-shaped bracket and extending outwardly therefrom;

a first adjusting screw extending into said first supporting member and positioned for contacting one of said limit switches as said carriage reciprocates in one direction; and a second adjusting screw extending into said second supporting member and positioned for contacting the other of said limit switches as said carriage reciprocates in a direction opposite from said one direction.

13. An automatic electric parking brake system as defined in claim 12 and further characterized to include a switch mounting bracket secured to said trackway and supporting said limit switches in alignment with said adjusting screws.

14. An automatic electric parking brake system as defined in claim 13 wherein each of said brake actuating elements comprises an elongated, rigid member of C-shaped transverse cross-sectional configuration having an elongated slot through the bight portion of the C-shaped cross section; and wherein said central guide member is an elongated member of H-shaped cross-sectional configuration defining a pair of longitudinally extending grooves slidingly receiving longitudinal edge portions of said brake actuating elements.

15. An automatic electric parking brake system as defined in claim 14 wherein said moving means comprises a retainer bolt secured to said central guide member and projecting through the elongated slots in said automatic and manual brake actuating elements.

16. An automatic electric parking brake system as defined in claim 15 and further characterized to include at least one adjustable link assembly connected to said lost motion assembly and between said carriage and said flexible means, said adjustable link assembly including:

an L-plate; and a threaded bolt threaded a pre-adjusted distance through said L-plate.

17. An automatic electric parking brake system as defined in claim 16 wherein said L-plate has an end connected to said carriage, and wherein said system further includes a spring connected to said threaded bolt and to said automatic brake actuating element.

18. An automatic electric parking brake system for an automobile comprising:
- a reversible motor;
- a trackway adapted for securement to said automobile;
- a carriage slidably mounted in said trackway;
- a threaded shaft secured to, and movable with, said carriage;
- gearing drivingly engaging said threaded shaft for driving said shaft in rotation;
- a housing around said gearing secured to said carriage, and said shaft passing through said housing;
- a flexible drive cable drivingly connected to said reversible motor and extending into said housing and connected to said gearing;
- an adjusting link assembly connected to said carriage;
- a flexible brake cable adapted for connection to the brakes of the automobile;
- means connecting said brake cable to said adjusting link assembly; and
- electrical circuitry including an automobile ignition switch connected to said reversible motor and driving said motor in one direction of rotation for a limited period of time when said ignition switch is turned on to close the circuitry, and driving said motor in an opposite direction of rotation when said ignition switch is turned off whereby the brakes of the automobile are applied and released in response to the status of the ignition switch.

19. An automatic electric parking brake system for an automobile as defined in claim 18 wherein said means connecting said brake cable to said adjusting link assembly comprises a lost motion assembly adapted for connection to an actuating element connectable to a manual brake applying device.